United States Patent [19]
Poon

[11] Patent Number: 5,880,940
[45] Date of Patent: Mar. 9, 1999

[54] LOW COST HIGH EFFICIENCY POWER CONVERTER

[75] Inventor: Franki Ngai Kit Poon, Hong Kong, Hong Kong

[73] Assignee: Computer Products, Inc., Fremont, Calif.

[21] Appl. No.: 804,049

[22] Filed: Feb. 21, 1997

Related U.S. Application Data

[60] Provisional application No. 60/037,293 Feb. 5, 1997.

[51] Int. Cl.$^6$ .......................... H02M 3/335; G05F 1/618
[52] U.S. Cl. .............................. 363/20; 323/224; 323/282
[58] Field of Search ................................ 323/223, 224, 323/247, 259, 282, 290; 363/16, 20, 21

[56] References Cited

U.S. PATENT DOCUMENTS

| | | | |
|---|---|---|---|
| 4,441,146 | 4/1984 | Vinciarelli | 363/20 |
| 4,912,620 | 3/1990 | O'Dell | 363/56 |
| 4,926,304 | 5/1990 | Marinus | 363/20 |
| 5,066,900 | 11/1991 | Bassett | 323/224 |

*Primary Examiner*—Peter S. Wong
*Assistant Examiner*—Y. J. Han
*Attorney, Agent, or Firm*—Skjerven, Morrill, MacPherson, Franklin & Friel LLP; Kenneth E. Leeds

[57] ABSTRACT

A switch mode power converter achieving high efficiency through zero voltage switching (ZVS) by using an auxiliary switch, a capacitor, an auxiliary winding and an inductor. The technique can be applied to a boost, buck-boost, buck, isolated forward or isolated flyback converter. The auxiliary switch is turned on before the main power switch turns on, and the capacitor provides voltage to energize the inductor and force current to flow into the auxiliary winding. The current is transformed by the main winding and discharges the capacitance across main power switch to zero volts before the main switch turns on. Hence ZVS is obtained and can greatly reduce the switching loss of the main power switch.

9 Claims, 7 Drawing Sheets

LOW COST HIGH EFFICIENCY POWER CONVERTER

This patent application claims priority based on U.S. provisional patent application Ser. No. 60/037,293 filed in the name of Franki Ngai Kit Poon on Feb. 5, 1997, entitled "Low Cost High Efficiency Power Converter".

BACKGROUND OF THE INVENTION

This invention relates to switch mode power converters.

The electronics industry strives to reduce the size and weight of power supplies for its products. One major factor that limits the size or power density of a power supply is its thermal behavior. Increasing the size of the heatsink for the power components can reduce thermal problems, but physical size of the power converter will limit the area of the heatsink that can be used. Alternatively, a smaller heatsink can be used if less heat is generated from the power components. Reducing heat generation is accomplished by increasing efficiency.

Two kinds of power loss are associated with the electronic switch of a switch mode power supply. First is the conduction loss, determined by the resistance of the switch when the switch is on. Second is the switching loss which is caused by the voltage and current overlap during the switching transition (i.e. when the switch turns on or off). The conduction loss can be reduced by choosing a lower resistance switch.

However, most low resistance electronic switches, e.g. low resistance MOSFETs, have increased stray capacitance across the switch terminals. The increased stray capacitance causes more switching loss during the switching transition when the stray capacitance discharges into the switch resistance. The usual technique to eliminate this drawback is using zero voltage switching (ZVS).

FIG. 1 is a schematic diagram of a prior art ZVS circuit. The two switches 1, 2 are programmed to turn on alternately. (Switches 1 and 2 cannot be on simultaneously or they will short circuit capacitor 6 across input voltage source 20.) When switch 1 is on, current flows from input voltage source 20, through winding 7 of transformer 30, and through switch 1, thereby causing winding 8 of transformer 30 to deliver power to a load 24 via a filter circuit 26.

When switch 1 is closed, voltage Vin is applied across winding 7. Since transformer 30 is inductive, when switch 1 opens, current through winding 7 cannot change instantaneously, and therefore begins to flow through a loop comprising diode 3 and capacitor 6. During the time in which diode 3 conducts current, switch 2 closes. During the time in which diode 3 conducts and the time in which switch 2 is closed, capacitor 6 is connected across winding 7.

Capacitor 6 provides a substantially constant reset voltage for transformer 30 to prevent transformer 30 from saturating. After switch 2 turns on, voltage across capacitor 6 forces current to flow into winding 7 in a direction A. Switch 2 then turns off, and the energy stored in winding 7 forces the current to change its path and discharge capacitor 5. (Capacitor 5 is the parasitic capacitance inherently present across switch 1.) Energy in capacitor 5 is pumped out of capacitor 5 and back to voltage source 20. After capacitor 5 is fully discharged, current flows through diode 4 so that approximately zero volts are applied across switch 1. Switch 1 then turns on under a ZVS condition. Further information concerning this circuit is shown in U.S. Pat. No. 5,126,931, issued to Jitaru.

To satisfy the ZVS condition for the circuit in FIG. 1, one must provide a) sufficient delay between the time switch 2 opens and the time switch 1 closes, and b) sufficient energy storage in winding 7 to discharge capacitor 5. One must also ensure that switches 1 and 2 are not on simultaneously. Given these constraints, engineers may find the practical design of this circuit difficult. A more simple circuit with fewer design constraints for achieving high efficiency is therefore sought.

SUMMARY OF THE INVENTION

A new circuit for switch mode power converters achieves high efficiency and zero voltage switching by using an auxiliary switch, a capacitor, an auxiliary winding and an inductor. This circuit can be applied in boost, buck-boost, buck, isolated forward or isolated flyback converters. A control circuit causes the auxiliary switch to turn-on before the main power switch, and the capacitor provides voltage to energize the inductor and force current to flow into the auxiliary winding. The current is transformed to the main winding and discharges capacitance across the main power switch to approximately zero volts before the main power switch turns on. Hence ZVS is obtained and can greatly reduce the switching loss across the main power switch.

DETAILED DESCRIPTION

Switch mode converters in accordance with my invention use a combination of an inductor, a capacitor, switches and a switch mode magnetic element.

Figure 1:
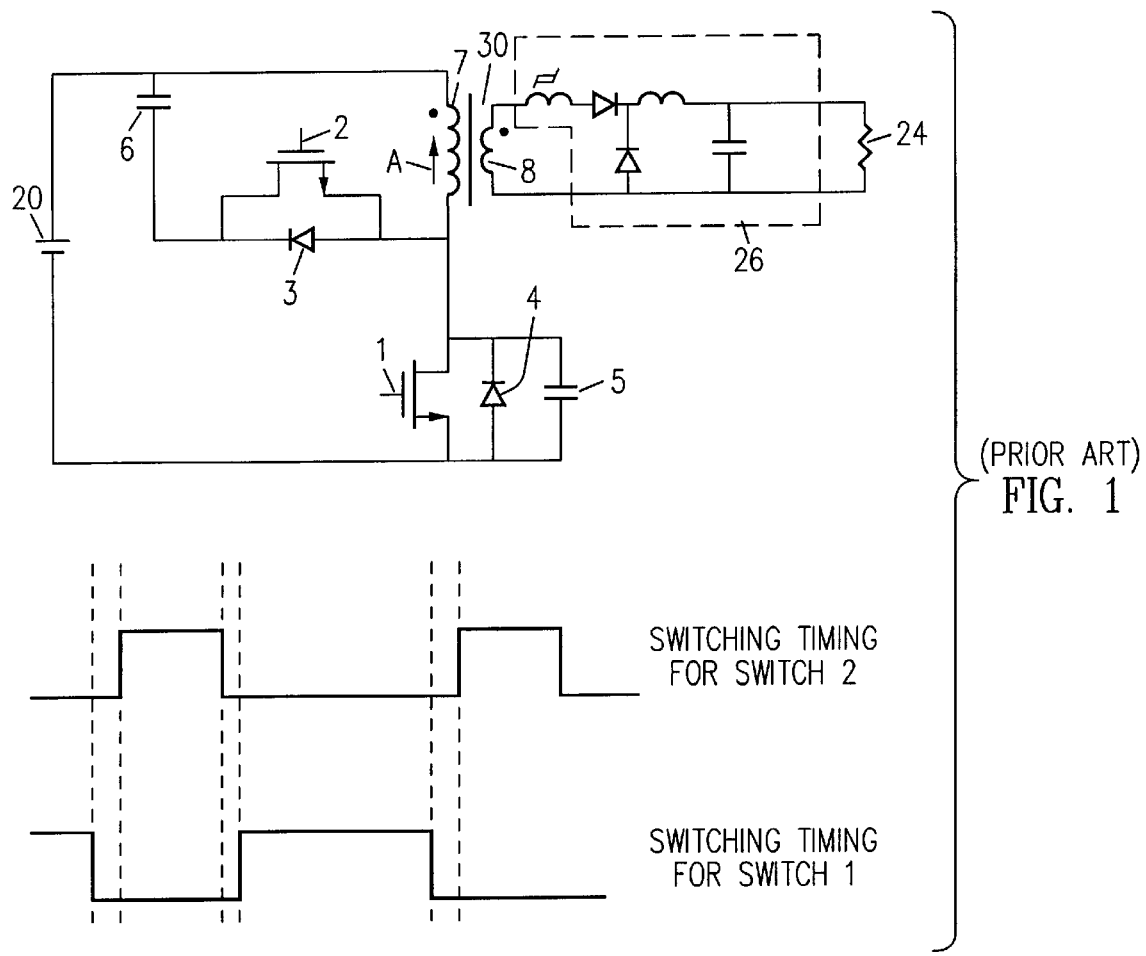
FIG. 1 is a schematic diagram of a prior art ZVS converter.
Figure 2A:
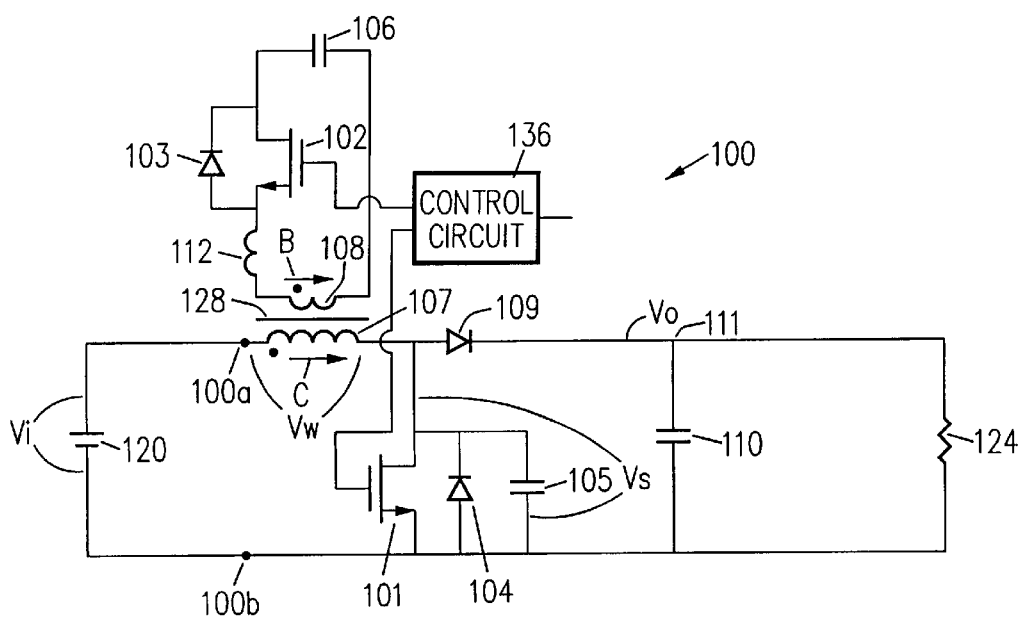
FIGS. 2A, 2B and 2C are schematic diagrams of three embodiments of the present invention applied in a) boost, b) buck, and c) buck-boost power converters, respectively.

The capacitor and inductor, in accordance with basic circuit theory, constitute a lossless way to exchange energy from one capacitor to another, e.g. from capacitor 106 to capacitor 105 in FIG. 2A. However, the switching converter should have at least one magnetic element connected in series within the loop of the main power switch and the input voltage source when the main power switch is on. The most basic type switching converters, i.e. buck, boost and buck-boost all have such a magnetic element.

In the embodiments of the invention discussed below, the voltage on a capacitor (106, 206, 306, 406 or 506) is used to force current to flow into an inductor (112, 212, 312, 412 or 512) and an auxiliary winding (108, 208, 308, 408 or 508), and that current is transformed to the main winding (107, 207, 307, 407 or 507) to discharge the capacitance across the main switch (101, 201, 301, 401 or 501) and hence reduce the voltage across the main switch before it is turned on.

First Non-Isolated Embodiment

FIG. 2A is a schematic diagram of a boost converter 100. During use, an input voltage Vi is applied across leads 100a and 100b by voltage source 120. Periodically, main power switch 101 turns on. While switch 101 is on, current flows through winding 107 and switch 101. Since winding 107 is inductive, current through winding 107 ramps up linearly; and energy is stored in winding 107.

When switch 101 opens, current flows through winding 107 and diode 109 to a load 124. In this way, energy previously stored in winding 107 is delivered to load 124. Thereafter, switch 101 closes so that energy can again be stored in winding 107.

As can be seen, a parasitic capacitance modeled by capacitor 105, exists across switch 101. Circuitry comprising winding 108, inductor 112, switch 102, diode 103 and capacitor 106 discharges parasitic capacitor 105 before switch 101 turns on, to thereby minimize switching losses.

The voltage Vs across switch 101 can be calculated using input voltage Vi and voltage Vw across winding 107 by the following equation:

$$Vs = Vi - Vw \quad \text{(equ. 1)}$$

Equation 1 shows that, for a given input voltage Vi, voltage Vs across main power switch 101 depends on voltage Vw across winding 107. Increasing voltage Vw reduces voltage Vs, thereby reducing the voltage during the switching transition of switch 101 and therefore reducing power loss. By designing converter 100 such that voltage Vw is greater than or equal to voltage Vi, zero volts can be obtained across main power switch 101.

As mentioned above, causing voltage Vw across winding 107 to increase is accomplished using an auxiliary winding 108 which is connected in series with inductor 112, auxiliary switch 102, and capacitor 106. Windings 107 and 108 are magnetically coupled together and form transformer 128. A diode 103 is coupled in parallel with auxiliary switch 102, and serves to restore energy to capacitor 106 from auxiliary winding 108. Diode 103 can be the intrinsic diode of MOSFET switch 102 or a discrete diode connected in parallel across switch 102.

Auxiliary switch 102 is turned on by a control circuit 136 just before main power switch 101 is turned on. Inductor 112 provides a lossless way to transfer energy from capacitor 106 through windings 107, 108 to discharge capacitor 105. Also, inductor 112 provides a zero current switching characteristic when switch 102 turns on. In other words, when auxiliary switch 102 turns on, inductor 112 ensures that initially no current flows through switch 102. Current through switch 102 and inductor 112 will then ramp up from zero. (Note that the inductance of inductor 112 is typically selected to ensure that the current through inductor 112 will be zero before switch 102 turns on.) Therefore, there will be very little energy loss associated with switch 102 turning on.

The energy loss associated with switch 102 turning on will also be minimized because winding 108 typically has fewer turns than winding 107, and therefore the voltage across switch 102 will be less than it would be if winding 108 had more turns.

Figure 2B:
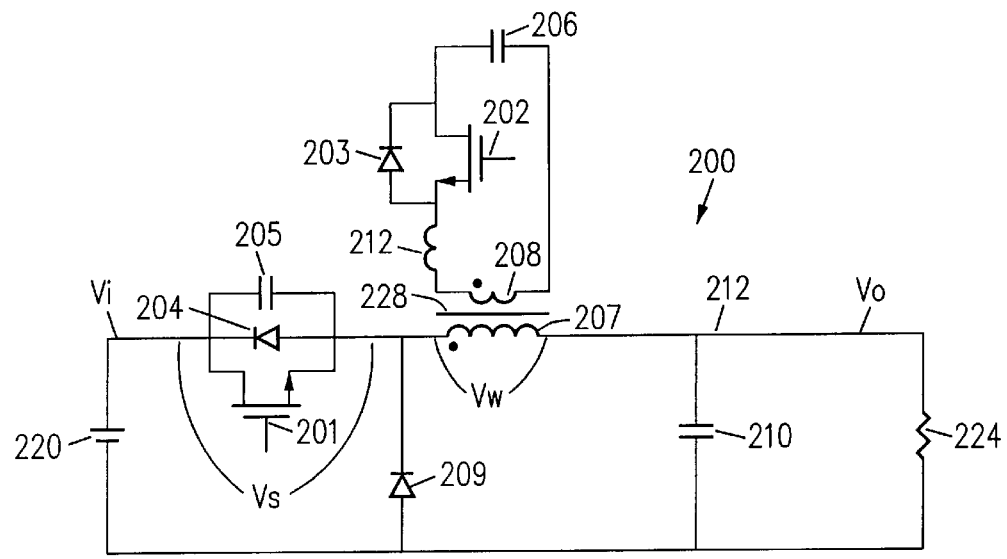
Figure 2C:
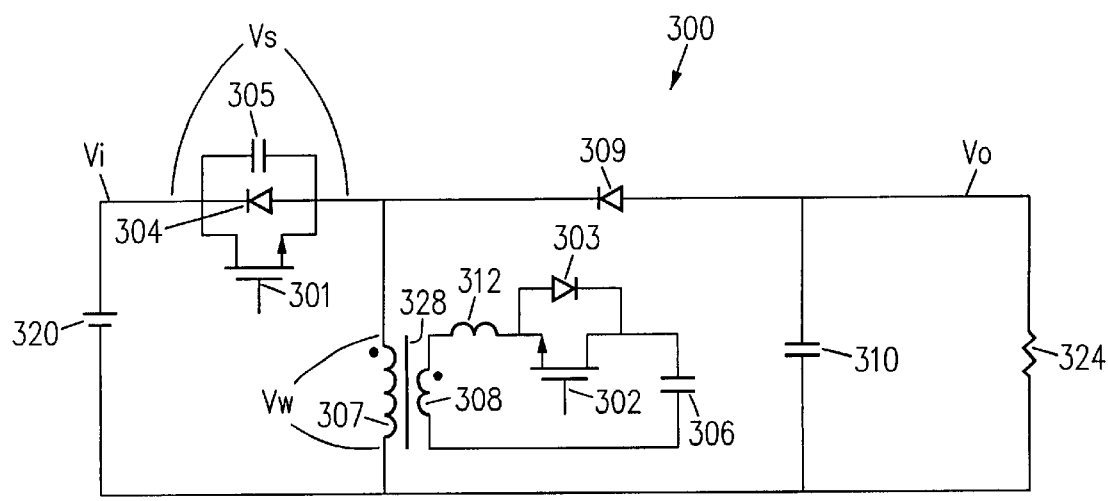
Figure 3:
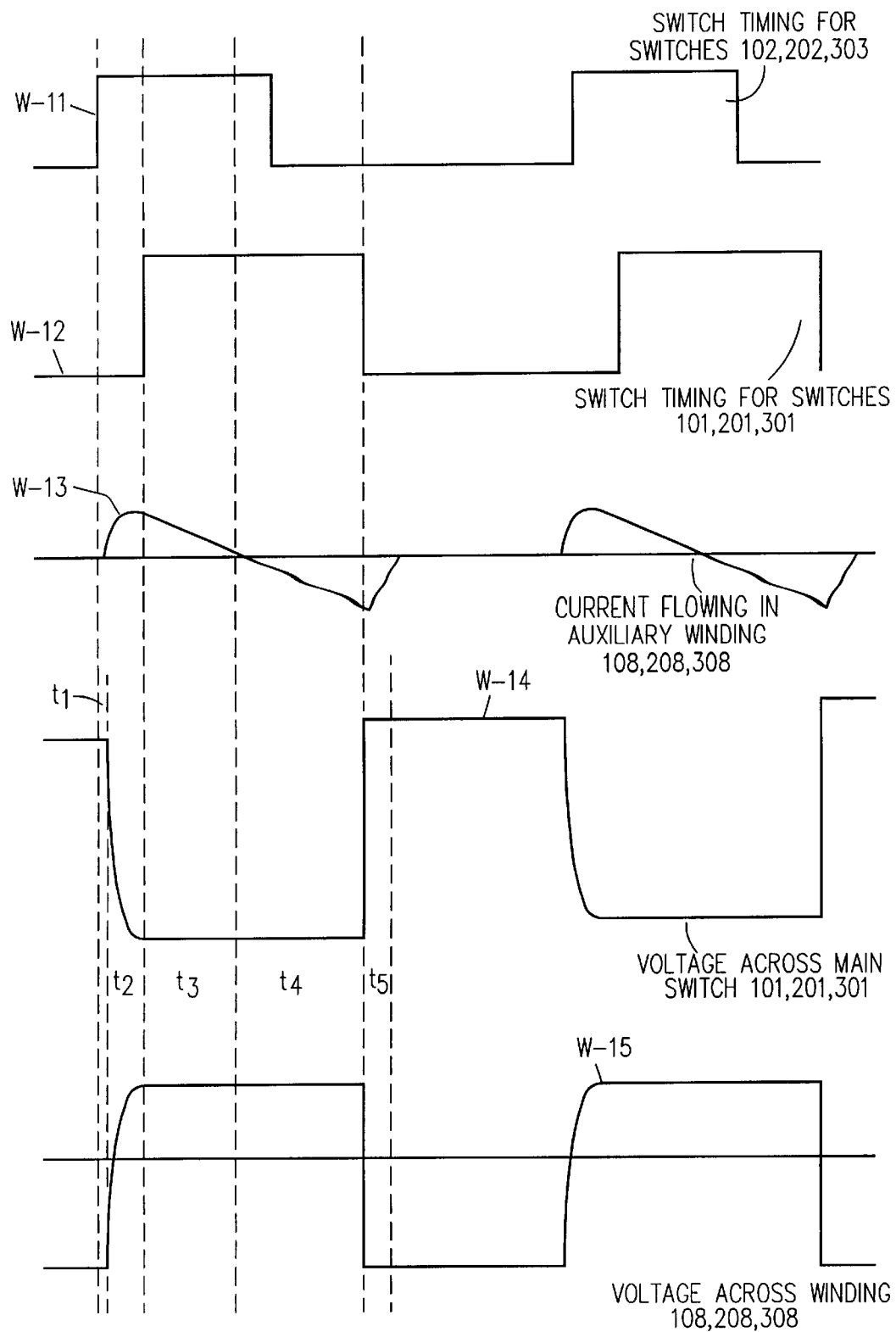
FIG. 3 is a waveform diagram illustrating operation of the power converters of FIGS. 2A to 2C.

FIG. 3 shows the timing of the on-time of switches 101 and 102 and corresponding voltage and current waveforms. Wave form W-11 shows the on-time for switch 102 (and also switches 202 and 302 for the embodiment of FIGS. 2B and 2C discussed below); waveform W-12 shows the on-time for switch 101 (and switches 201 and 301 discussed below); waveform W-13 shows the current flowing through auxiliary winding 108 (and 208 and 308); waveform W-14 shows the voltage across switch 101 (and 201 and 301) and waveform W-15 shows the voltage across winding 108 (and 208 and 308).

When switch 102 turns on, voltage across capacitor 106 drives current through inductor 112 and auxiliary winding 108 in a direction B. If winding 107 is carrying current (e.g. in direction C), the ampere-turns of auxiliary winding 108 increase to equal the ampere-turns of winding 107; this will reset the magnetic element of transformer 128 and turn off diode 109. The period for this state is shown in FIG. 3 as $t_1$. During period $t_1$, voltage Vs across main power switch 101 and voltage Vw across winding 107 remain unchanged. The voltage across winding 107 is negative in accordance with the polarity convention established by equation 1.

At the end of period $t_1$, the magnetic element of transformer 128 has been reset by the current flowing in auxiliary winding 108, and the voltage across winding 107 begins to reverse. This voltage change across winding 107 resonates with a frequency determined by capacitance 105 and inductor 112. The maximum obtainable voltage, Vw, across winding 107 is determined by the following equation:

$$Vm = 2Vz \frac{N1}{Nz} \frac{Lm}{Lm + Lz} \quad \text{(equ. 2)}$$

where Vz is the voltage across capacitor 106, N1 is the number of turns of winding 107, Nz is the number of turns of winding 108, Lz is the inductance of inductor 112 and Lm is the magnetizing inductance of winding 108. The value of capacitor 106 is assumed to be large enough to maintain a substantially constant voltage throughout one switching cycle. By choosing the turns ratio of winding 107 to winding 108 and inductance Lz, a zero voltage condition can be obtained across main power switch 101 before switch 101 turns on.

The period between the end of $t_1$, and the time main power switch 101 turns on is defined as $t_2$ as shown in FIG. 3. During period $t_2$, voltage Vs across main power switch 101 resonates, and it is desirable to turn switch 101 on near the minimum voltage point of the resonant voltage waveform.

It is possible to design converter 100 such that voltage Vw has a maximum value larger than the supply voltage Vi. In that case, the voltage across switch 101 will become negative and be clamped by diode 104 to approximately −0.7V. Main power switch 101 can be turned on after the voltage across switch 101 is at −0.7V, and substantially zero voltage switching will result. It should be noted that it is unnecessary to force the voltage across switch 101 drop to −0.7V before switch 101 is turned on. Any significant reduction of the voltage across switch 101 prior to the switching transition will reduce the loss in that switch.

The reduction of switching loss is accomplished during period $t_2$. During periods $t_3$, $t_4$ and $t_5$, the current flowing in inductor 112 decreases and reverses direction in order to restore energy to capacitor 106.

During period $t_3$, main power switch 101 is turned on and the voltage across winding 107 (and 108) is determined by the input voltage Vi. Due to the partial discharge of capacitor 106, the voltage across winding 108 will be greater than the voltage on capacitor 106 so the current flowing in inductor 112 gradually ramps down to zero.

During period $t_4$, current flowing in inductor 112 reverses; at this time, energy begins to transfer from winding 107 to winding 108 to recharge capacitor 106. Auxiliary switch 102 can be turned off during period $t_4$ as diode 103 provides a path for the reverse current flow to capacitor 106. At the beginning of period $t_5$, main power switch 101 is turned off and the voltage across windings 107 and 108 reverses. This will reverse the voltage on inductor 112 and force the current flowing in inductor 112 to rapidly decrease to zero. Diode 103 now blocks, and current flow in inductor 112 ceases until auxiliary switch 102 turns on again.

Second Non-Isolated Embodiment

FIG. 2B shows a schematic diagram of a buck converter. In FIG. 2B, when main power switch 201 is on, current flows from input voltage source 220, through switch 201 and inductive winding 207 to load 224. During this time period, inductive energy is stored in winding 207. When switch 201 opens, current flows in a loop comprising winding 207, load 224 and diode 209, thereby delivering energy from winding 207 to load 224. Thereafter, main power switch 201 is turned on again. In order to minimize switching losses caused when switch 201 turns on, circuitry comprising winding 208, inductor 212, switch 202 and capacitor 206 is used to discharge parasitic capacitance 205 before switch 201 turns on. Voltage Vs across switch 201 can be calculated using input voltage Vi, output voltage Vo and voltage Vw across winding 207 with the following equation:

$$Vs = Vi - Vw - Vo \qquad \text{(equ. 3)}$$

Equation 3 shows that, for a given input voltage Vi and output voltage Vo, voltage Vs across main power switch 201 depends on voltage Vw across winding 207. Increasing voltage Vw across winding 207 reduces voltage Vs across switch 201 during the switching transition and also reduces the power loss. By designing voltage Vw to be greater than or equal to voltage Vi, zero volts can be obtained across main power switch 201.

As mentioned above, causing voltage Vw across winding 207 to increase is accomplished using auxiliary winding 208, which is connected in series with inductor 212, auxiliary switch 202, and capacitor 206. Windings 207 and 208 are magnetically coupled together and form a transformer 228. A diode 203 is paralleled with auxiliary switch 202, and serves to restore energy to capacitor 206 from auxiliary winding 208. Diode 203 can be the intrinsic diode of MOSFET switch 202 or a discrete diode connected in parallel with switch 202.

Auxiliary switch 202 is turned on just before main power switch 201 turns on. Inductor 212 provides a lossless way to transfer energy from capacitor 206 to discharge capacitor 205. Also, it provides a zero current switching characteristic when switch 202 turns on. FIG. 3 shows the timing of the on time of switches 201 and 202 and corresponding voltage and current waveforms.

When switch 202 turns on, voltage across capacitor 206 drives current into inductor 212 and auxiliary winding 208. If winding 207 is carrying current, the ampere-turns of auxiliary winding 208 increase to equal the ampere-turns of winding 207; this resets the magnetic element of transformer 228 and turns off diode 209. The period for this state is shown in FIG. 3 as $t_1$. During period $t_1$, voltage Vs across main power switch 201 and voltage Vw across winding 207 remain unchanged. Voltage Vw across winding 207 is negative in accordance with the polarity convention established by equation 3.

At the end of period $t_1$, the magnetic element of transformer 228 has been reset by the current flowing in auxiliary winding 208, and voltage Vw across winding 207 begins to reverse. This voltage change resonates with a frequency determined by capacitance 205 across main power switch 201 and inductor 212. The maximum obtainable voltage Vm across winding 207 is determined by the following equation:

$$Vm = 2Vz \frac{N1}{Nz} \frac{Lm}{Lm + Lz} \qquad \text{(equ. 4)}$$

Where Vz is the voltage across capacitor 206, N1 is the number of turns of winding 207, Nz is the number of turns of winding 208, Lz is the inductance of inductor 212 and Lm is the magnetizing inductance of winding 208. The capacitance of capacitor 206 is assumed to be large enough to maintain a substantially constant voltage throughout one switching cycle. By choosing the turns ratio of winding 207 to winding 208 and Lz, a zero voltage condition can be obtained across main power switch 201 before switch 201 turns on.

The period between the end of $t_1$ and when main power switch 201 turns on is defined as $t_2$ as shown in FIG. 3. During period $t_2$, the voltage across main power switch 201 resonates, and it is desirable to turn on switch 201 near the minimum voltage point of the resonant voltage waveform.

It is possible to design converter 200 such that voltage Vw has a maximum value larger than supply voltage Vi. In that case, voltage Vs across switch 201 becomes negative and is clamped by diode 204 to approximately −0.7V. Main power switch 201 can be controlled to turn on after that condition, and substantially zero voltage switching results. It should be noted that it is unnecessary to force the voltage across switch 201 to drop to −0.7V before switch 201 is turned on. Any significant reduction of the voltage across switch 201 prior to the switching transition reduces the loss in switch 201.

The reduction of switching loss is accomplished during period $t_2$. During periods $t_3$, $t_4$ and $t_5$, the current through inductor 212 decreases and reverses direction in order to restore energy to capacitor 206. During period $t_3$, main power switch 201 is on and the voltage across windings 207 and 208 is determined by input voltage Vi. Due to the partial discharge of capacitor 206, the voltage across winding 208 will be greater than the voltage on capacitor 206 so the current flowing in inductor 212 gradually ramps down to zero.

During period $t_4$, current flowing in inductor 212 reverses; at this time, energy begins to transfer from winding 207 to 208 to recharge capacitor 206. Auxiliary switch 202 can be turned off during period $t_4$ as diode 203 provides a path for the reverse current flow to capacitor 206. At the beginning of period $t_5$, main power switch 201 is turned off and the voltage across windings 207 and 208 reverses. This will reverse the voltage on inductor 212 and force the current flowing in the inductor decrease rapidly to zero. Diode 203 now blocks, and current flow in inductor 212 ceases until auxiliary switch 202 turns on again.

Third Non-Isolated Embodiment

FIG. 2C is a schematic diagram of a buck-boost converter. In FIG. 2C, when main power switch 201 is on, current flows from input voltage source 320 and through main power switch 301 and inductive winding 307, thereby storing energy in inductive winding 307. When switch 301 opens, current flows through winding 307, load 324 and diode 309 to deliver energy from winding 307 to load 324. Thereafter, main power switch 301 is turned on again. In order to minimize switching losses caused when switch 301 turns on, circuitry comprising winding 308, switch 302, inductor 312 and capacitor 306 is used to discharge capacitance 305 before switch 301 turns on. Voltage Vs across switch 301 can be calculated using input voltage Vi and voltage Vw across winding 307 by the following equation:

$$Vs = Vi - Vw \qquad \text{(equ.5)}$$

Equation 5 shows that, for a given input voltage Vi, voltage Vs across main power switch 301 depends on voltage Vw across winding 307. Increasing voltage Vw reduces voltage Vs, thereby reducing the voltage across switch 301 during the switching transition and also reducing power loss. By designing converter 300 such that voltage Vw is greater than or equal to voltage Vi, zero voltage switching can be obtained for main power switch 301.

As mentioned above, causing voltage Vw to increase across winding 307 is accomplished using auxiliary winding 308 which is connected in series with inductor 312, auxiliary switch 302 and capacitor 306. Winding 307 and winding 308 are magnetically coupled together and form a transformer 328. A diode 303 is paralleled with auxiliary switch 302, and serves to restore energy to capacitor 306 from auxiliary winding 308. Diode 303 can be the intrinsic diode of MOSFET switch 302 or a discrete diode connected in parallel with switch 302.

Auxiliary switch 302 is turned on just before main power switch 301 turns on. Inductor 312 provides a lossless way to transfer energy from capacitor 306 to discharge capacitor 305. Also, inductor 312 provides a zero current switching characteristic when switch 302 turns on. FIG. 3 shows the timing of the switches and corresponding voltage and current waveforms.

When switch 302 turns on, voltage across capacitor 306 drives current into inductor 312 and auxiliary winding 308. If winding 307 is carrying current, the ampere-turns of auxiliary winding 308 increases to equal the ampere-turns of winding 307; this resets transformer 328 and turns off diode 309. The period for this state is shown in FIG. 3 as $t_1$. During period $t_1$, voltage Vs across main power switch 301 and voltage Vw across winding 307 remain unchanged. Voltage Vw across winding 307 is negative in accordance at with the polarity convention established by equation 5.

At the end of period $t_1$, the magnetic element of transformer 312 has been reset by the current flowing in auxiliary winding 308, and the voltage across winding 307 begins to reverse. This voltage change resonates with a frequency determined by capacitance 305 across main power switch 301 and inductor 312. The maximum obtainable voltage, Vm, across winding 307 is determined by the following equation:

$$Vm = 2Vz \frac{N1}{Nz} \frac{Lm}{Lm + Lz} \qquad \text{(equ. 6)}$$

where vz is the voltage across capacitor 306, N1 is the number of turns of winding 307, Nz is the number of turns of winding 308, Lz is the inductance of inductor 312 and Lm is the magnetizing inductance of auxiliary winding 308. The capacitance of capacitor 306 is assumed to be large enough to maintain a substantially constant voltage throughout one switching cycle. By choosing the turns ratio of winding 307 to winding 308 and Lz, a zero voltage condition can be obtained across main power switch 301 before switch 301 turns on.

The period between the end of $t_1$ and when main power switch 301 turns on is defined as $t_2$ as shown in FIG. 3. During period $t_2$, the voltage across main power switch 301 resonates, and it is desirable to turn switch 301 on near the minimum voltage point of the resonant voltage waveform.

It is possible to design converter 300 such that voltage Vw has a maximum value larger than supply voltage Vi. In that case, the voltage across switch 301 becomes negative and is clamped by diode 304 to approximately −0.7V. Main power switch 301 can be turned on after that condition, and substantially zero voltage switching will result. It should be noted that it is unnecessary to force the voltage across switch 301 drop to −0.7V before switch 301 is turned on. Any significant reduction of the voltage across switch 301 prior to the switching transition will reduce the loss in that switch.

The reduction of switching loss is accomplished during period $t_2$. During periods $t_3$, $t_4$ and $t_5$, the current flowing in inductor 312 decreases and reverses direction in order to restore energy to capacitor 306.

During period $t_3$, main power switch 301 turns on and the voltage across windings 307 and 308 is determined by input voltage Vi. Due to the partial discharge of capacitor 306, the voltage on winding 308 will be greater than the voltage on capacitor 306 so the current flowing in inductor 312 gradually ramps down to zero.

During period $t_4$, current flowing in inductor 312 reverses; at this time, energy begins to transfer from winding 307 to 308 to recharge capacitor 306. Auxiliary switch 302 can be turned off within period $t_4$ as diode 303 provides a path for the reverse current flow to capacitor 306. At the beginning of period $t_5$, main power switch 301 is turned off and the voltage across windings 307 and 308 reverses. This reverses the voltage on inductor 312 and forces the current flowing in inductor 312 to drop rapidly to zero. Diode 303 now blocks, and current flow in inductor 312 ceases until auxiliary switch 302 turns on again.

Summary of Non-Isolated Embodiments

The circuits of FIGS. 2A, 2B and 2C use the voltage on a capacitor (106, 206 or 306) to force current flow into an inductor (112, 212 or 312) and auxiliary winding (108, 208 or 308), and that current is transformed by the main winding (107, 207 or 307) to discharge the capacitance across the main switch (101, 201 or 301). This reduces the switching loss of the main switch, which is a main object of the invention.

As energy is delivered from the capacitor (106, 206 or 306) during the switching transition, the capacitor must be recharged in order to provide energy for the next switching cycle. The recharge energy is provided from the auxiliary winding while the main switch is on, and flows through the inductor (112, 212 or 312) and the diode (103, 203 or 303).

This method of discharging the capacitance across the main switch and obtaining zero voltage switching differs from prior ZVS circuits. In the prior art, the energy for ZVS is stored in an inductor, and ZVS is initiated when the auxiliary switch turns off. In my invention, energy for ZVS is stored in a capacitor, and ZVS is initiated when the auxiliary switch turns on.

Finally, in my invention, the on time of the auxiliary switch is allowed to overlap with the on time of the main switch, and this permits easier design.

First Isolated Embodiment

Figure 4A:
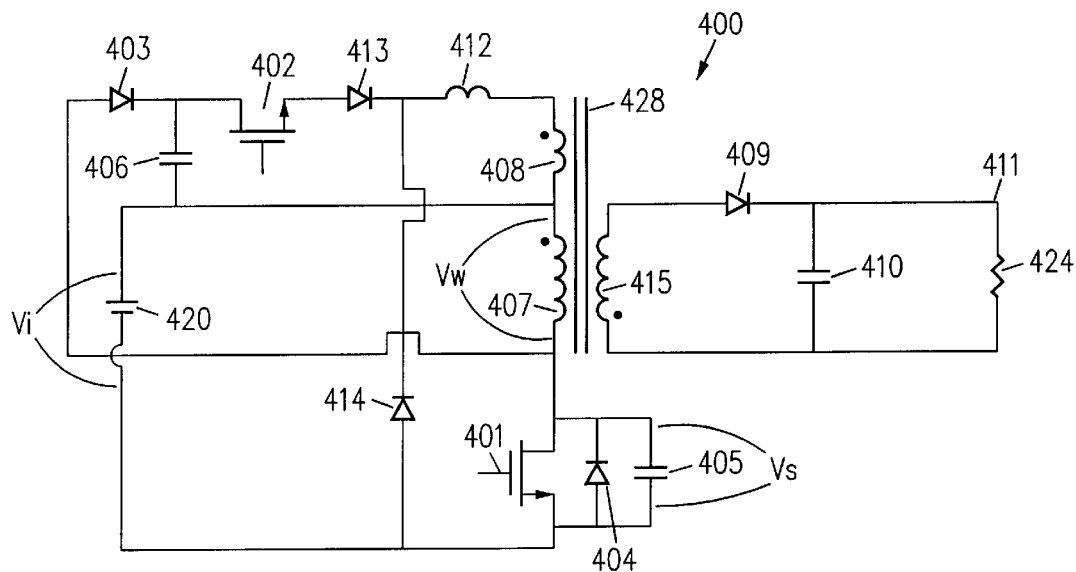
FIGS. 4A and 4B are schematic diagrams of embodiments of the invention applied in isolated flyback and forward power converters.
Figure 4B:
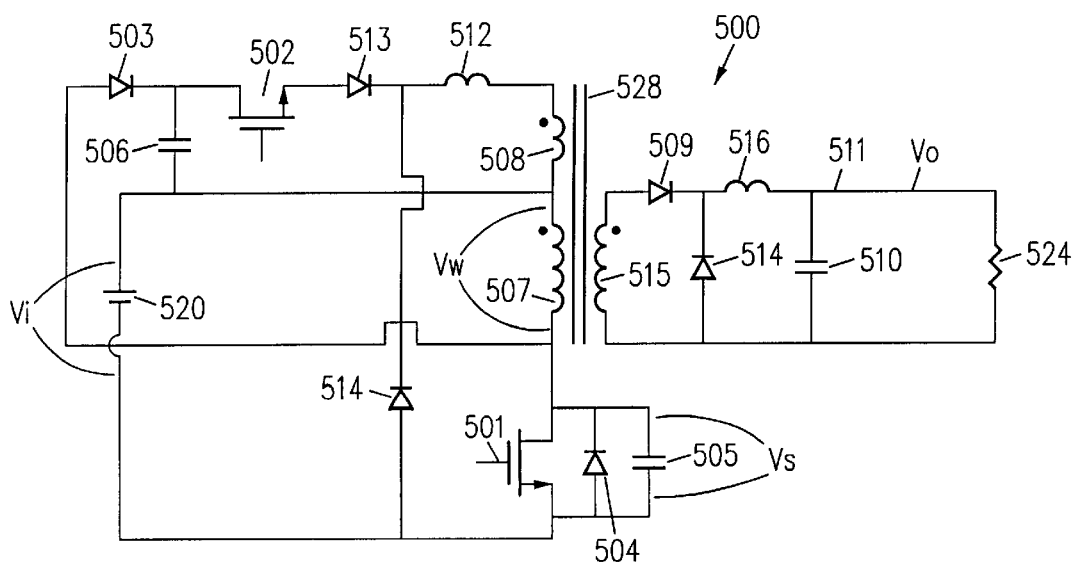

The discharging of the parasitic capacitor across a main power switch can be accomplished in other types of switching converters. FIGS. 4A and 4B show isolated flyback and forward converters in which the parasitic capacitance is discharged. These converters offer additional advantages discussed below.

FIG. 4A shows a schematic diagram of an isolated flyback converter 400. In FIG. 4A, when main power switch 401 is on, current flows from input voltage source 420, through winding 407, and through switch 401, thereby storing inductive energy in flyback transformer 428. When switch 401 opens, the energy previously stored in transformer 428 is delivered via winding 415 and diode 409 to load 424. Thereafter, switch 401 is turned on to again store energy in transformer 428.

A parasitic capacitance modeled as capacitor 405 exists across switch 401. Circuitry comprising winding 408, capacitor 406, inductor 412 and switch 402 discharges capacitor 405 before switch 401 turns on, thereby minimizing switching losses. Voltage Vs across switch 401 can be calculated using the input voltage and the voltage Vi across Vw winding 407 by the following equation:

$$Vs = Vi - Vw \qquad \text{(equ. 7)}$$

Equation 7 shows that, for a given input voltage Vi, voltage Vs across main power switch 401 depends on voltage Vw across winding 407. Increasing voltage Vw reduces voltage Vs, thereby reducing the voltage during the switching transition and also reducing the power loss. By designing converter 400 such that voltage Vw is greater than or equal to voltage Vi, zero volts can be obtained across main power switch 401.

As mentioned above, causing voltage Vw to increase across winding 407 is accomplished using auxiliary winding 408, which is connected in series with an inductor 412, auxiliary switch 402 and capacitor 406. Windings 407, 408 and secondary winding 415 are magnetically coupled together as part of transformer 428. Diode 413, in series with auxiliary switch 402, prevents reverse current flow from auxiliary winding 408 through the intrinsic diode of switch 402. Energy is restored to capacitor 406 through diode 403 which is connected to primary winding 407 of transformer 428.

Auxiliary switch 402 turns on just before main power switch 401 turns on. Inductor 412 provides a lossless way to transfer energy from capacitor 406 to discharge capacitor 405, and diode 414 provides a path to discharge inductor 412 after switch 402 turns off.

Figure 5:
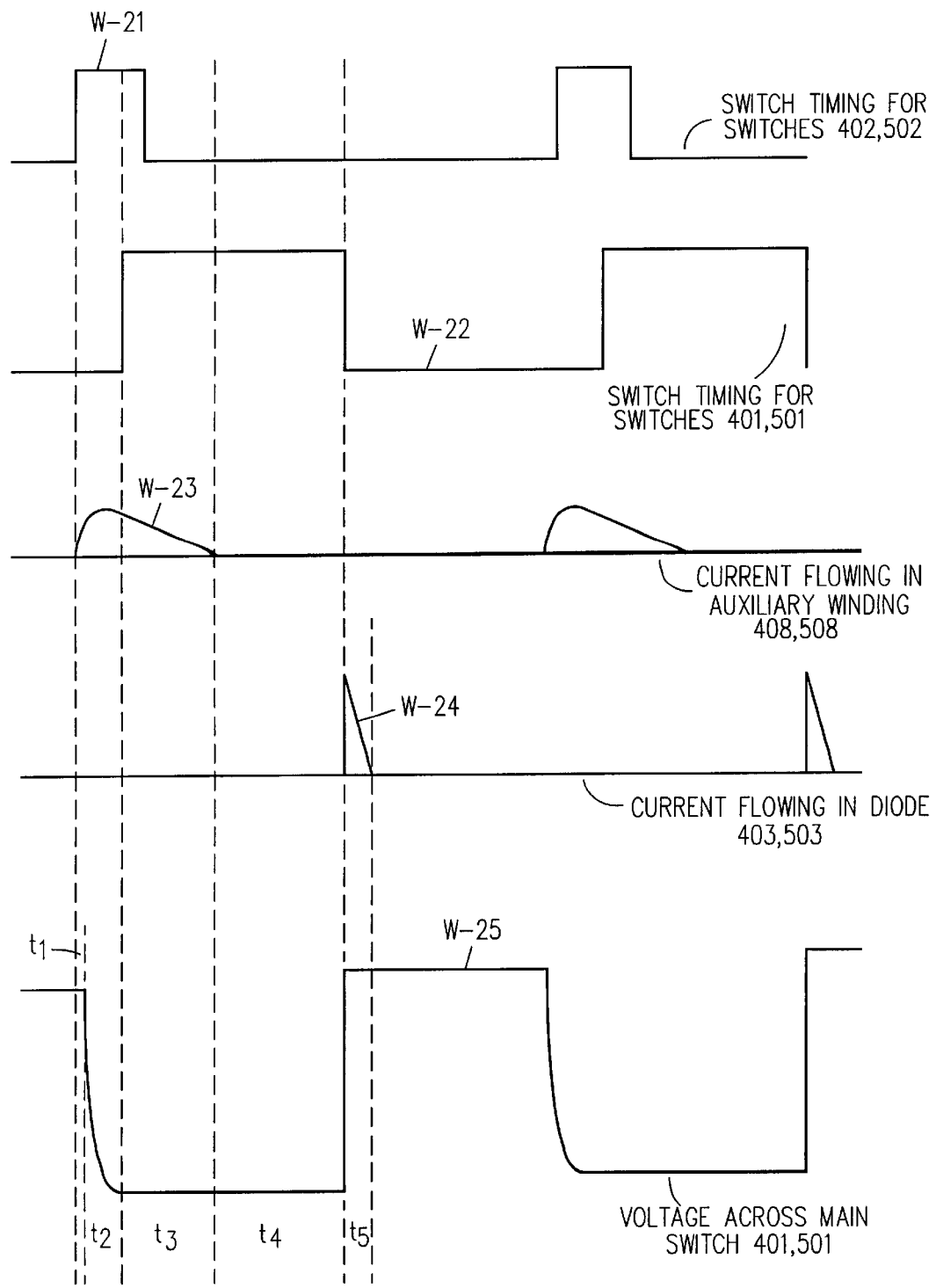
FIG. 5 is a waveform diagram illustrating operation of the power converters of FIGS. 4A and 4B.

FIG. 5 shows the timing of the on time of the switches and corresponding voltage and current waveforms. Waveform W-21 shows the on time of switch 402 (and switch 502 in the embodiment of FIG. 4B); waveform W-22 shows the on-time of switch 401 (and 501); waveform W-23 shows the current flowing through winding 408 (and 508); waveform W-24 shows the current flowing through diode 403 (and 503); and waveform W-25 shows the voltage across switch 401 (and 501).

When switch 402 turn on, voltage across capacitor 406 drives current through inductor 412 and auxiliary winding 408. If winding 415 is carrying current, the ampere-turns of auxiliary winding 408 increases to equal the ampere-turns of winding 415; this will reset transformer 428 and turn off diode 409. The period for this state is shown in FIG. 5 as $t_1$.

During period $t_1$, the voltage across main power switch 401, and the voltage across winding 407, remain unchanged. The voltage across winding 407 is negative in accordance with the polarity convention established by equation 7.

At the end of period $t_1$, transformer 428 has been reset by the current flowing in auxiliary winding 408, and the voltage across winding 407 begins to reverse. This voltage change resonates with a frequency determined by capacitance 405 across main power switch 401 and inductor 412. The maximum obtainable voltage, Vm, across the winding 407 is determined by the following equation:

$$Vm = 2Vz \frac{N1}{Nz} \frac{Lm}{Lm+Lz} \qquad \text{(equ. 8)}$$

where Vz is the voltage across capacitor 406, N1 is number of turns of winding 407, Nz is number of turns of winding 408, Lz is the inductance of inductor 412 and Lm is the magnetizing inductance of auxiliary winding 408. The capacitance of capacitor 406 is assumed to be large enough to maintain a substantially constant voltage throughout one switching cycle. By choosing the turns ratio of winding 407 to 408 and Lz, a zero voltage condition can be obtained across main power switch 401 before switch 401 turns on.

The period between the end of $t_2$ and when main power switch 401 turns on is shown as period $t_2$ in FIG. 5. During period $t_2$, the voltage across main power switch 401 resonates, and it is desirable to turn on switch 401 near the minimum point of the resonant voltage waveform.

It is possible to design converter 400 such that voltage Vw has a maximum value larger than the supply voltage Vi. In that case, the voltage across switch 401 becomes negative and is clamped by diode 404 to approximately –0.7V. Main power switch 401 can be turned on after that condition, and substantially zero voltage switching will result. It should be noted that it is unnecessary to force the voltage across switch 401 drop to –0.7V before switch 401 is turned on. Any significant reduction of the voltage across switch 401 prior to the switching transition reduces the loss in that switch. The reduction of switching loss is accomplished during period $t_2$.

During period $t_3$, the current flowing in inductor 412 decreases as remaining energy is transferred to transformer 428. Switch 402 can be turned off any time before main switch 401 turns off. Diode 414 provides a path for current from inductor 412 after switch 402 turns off. To force conduction of diode 414, the voltage on inductor 412 must increase greatly, and this causes a rapid decrease of current to zero.

During period $t_4$, no current flows in diodes 403, 413, 414, inductor 412 or auxiliary winding 408, and the circuit works as a conventional flyback converter.

At the beginning of period $t_5$, main power switch 401 turns off, and the voltage across winding 407 reverses. Energy stored in the magnetizing inductance of winding 407 during the on time of main power switch 401 is transferred to load 424 (via secondary winding 415 and diode 409) and also to capacitor 406 (via diode 403). Current flowing through diode 403 into capacitor 406 restores the energy used for zero voltage switching during the prior switching cycle.

In addition, capacitor 406 absorbs leakage energy from winding 407 and eliminates the high voltage spike which is typical of prior art flyback power converters. This spike occurs because the leakage inductance of winding 407 prevents the instantaneous transfer of current to secondary winding 415, so charging capacitor 406 provides a path for current until current flow is established in secondary winding 415. The energy stored in capacitor 406 provides the energy needed for zero voltage switching during the next switching cycle.

Because the remaining energy in inductor 412 was discharged through winding 407 and 408, the energy was transferred to transformer 428 and is available for subsequent transfer to the output when main power switch 401 turns off. This provides additional efficiency and differentiates this new circuit from prior art flyback converters.

Second Isolated Embodiment

FIG. 4B shows a schematic diagram of an isolated forward converter. In FIG. 4B, when main power switch 501 is on, current flows from an input voltage source 520, through winding 507 and switch 501. This causes energy to be delivered to load 524 by secondary winding 515 via a filter circuit (comprising diodes 509 and 514, inductor 516 and capacitor 510).

Thereafter, switch 501 turns off. A parasitic capacitance (modeled as capacitor 505) exists across switch 501. Circuitry comprising winding 508, capacitor 506, inductor 512 and switch 502 is used to discharge capacitor 505 before switch 501 turns on, thereby minimizing switching losses.

Voltage Vs across switch 501 can be calculated using input voltage vi and voltage Vw across winding 507 by the following equation:

$$Vs = Vi - Vw \qquad \text{(equ. 9)}$$

Equation 9 shows that, for a given input voltage Vi, voltage Vs across main power switch 501 depends on voltage Vw across winding 507. Increasing voltage Vw reduces voltage Vs, thereby reducing the voltage during the switching transition and also reducing the power loss. By designing converter 500 such that voltage Vw is greater than or equal to Vi, zero volts can be obtained across main power switch 501 during switching.

As mentioned above, causing voltage Vw to increase across winding 507 is accomplished using auxiliary winding 508 which is connected in series with inductor 512, auxiliary switch 502 and capacitor 506. Windings 507 and 508 and secondary winding 515 are magnetically coupled together and form transformer 528. Diode 513, in series with auxiliary switch 502, prevents reverse current flow from auxiliary winding 508 through intrinsic diode of switch 502. Energy is restored to capacitor 506 through diode 503 which is connected to primary winding 507 of transformer 528.

Auxiliary switch 502 is turned on just before main power switch 501 turns on. Inductor 512 provides a lossless way to transfer energy from capacitor 506 to discharge capacitor 505, and diode 514 provides a path to discharge inductor 512 after switch 502 turns off. Also, like inductors 112, 212, 312 and 412, inductor 512 permits zero current switching for switch 502, thereby minimizing energy loss associated with turn on of switch 502. Energy loss can be further minimized by having the number of turns of winding 508 be less than the number of turns of winding 507. (Typically, the number of turns of windings 108, 208, 308 and 408 are less than the number of turns of windings 107, 207, 307 and 407 to minimize energy loss associated with turn-on of switches 102, 202, 302, 402, respectively.)

FIG. 5 shows the timing of the on time of switches 501 and 502 and corresponding voltage and current waveforms. When switch 502 turns on, voltage across capacitor 506 drives a ramping current into inductor 512 and auxiliary winding 508. This current begins to magnetize transformer 528 which was reset after main power switch 501 turned off. The ampere-turns of auxiliary winding 508 increase and cause equal ampere-turns in winding 515. The ramping current flowing in winding 508 will gradually replace the current flowing in diode 514 and finally force diode 514 to turn off and diode 509 to turn on. The period for this state is shown in FIG. 5 as $t_1$.

During period $t_1$, the voltage across winding 507 remains near zero.

After period $t_1$, a positive voltage begins to increase across winding 507. This voltage change is resonates with a frequency determined by the capacitance 505 across main power switch 501 and inductor 512. The maximum voltage, Vm, across the winding 507 is determined by the following equation:

$$Vm = 2Vz \frac{N1}{Nz} \frac{Lm}{Lm + Lz} \qquad \text{(equ. 10)}$$

where Vz is the voltage across capacitor 506, N1 is the number of turns of winding 507, Nz is the number of turns of winding 508, Lz is the inductance of inductor 512 and Lm is the magnetizing inductance of auxiliary winding 508. The capacitance of capacitor 506 is assumed to be large enough to maintain a substantially constant voltage throughout one switching cycle. By choosing the turns ratio of winding 507 to 508 and Lz, a zero voltage condition can be obtained across the main power switch 501 before switch 501 turns on.

The period between the end of $t_1$, and when main power switch 501 turns on is defined as $t_2$ as shown in FIG. 3. During period $t_2$, the voltage across main power switch 501 resonates, and it is desirable to turn switch 501 on near the minimum point of the resonant voltage waveform.

It is possible to design converter 500 such that voltage Vw has a maximum value larger than supply voltage Vi. In that case, the voltage across switch 501 becomes negative and is clamped by diode 504 to approximately −0.7V. Main power switch 501 can be turned on after that condition, and zero voltage switching results. It should be noted that it is unnecessary to force the voltage across switch 501 drop to −0.7V before switch 501 is turned on. Any significant reduction of the voltage across switch 501 prior to the switching transition reduces the loss in that switch. The reduction of switching loss is accomplished during period $t_2$.

During period $t_3$, the current flowing in the inductor 512 decreases as remaining energy is transferred to transformer 528. Switch 502 can be turned off any time before main switch 501 turns off. Diode 514 provides a path for current from inductor 512 after switch 502 turns off. To force conduction of diode 514, the voltage on inductor 512 must increase greatly, and this causes a rapid decrease of current through inductor 512 to zero.

During period $t_4$, no current flows in diodes 503, 513, 514, inductor 512 or auxiliary winding 508, and the circuit works as a conventional forward converter.

At the beginning of period $t_5$, main power switch 501 turns off, and the voltage across winding 507 reverses. Energy stored in the magnetizing inductance of winding 507 during the on time of main power switch 501 cannot be transferred to the output but can transfer to capacitor 506. Current flows through diode 503 into capacitor 506 and restores the energy used for zero voltage switching during the prior switching cycle.

This transfer of magnetizing energy from winding 507 eliminates the high voltage spike which is typical of prior art power forward converters. This spike occurs because the magnetizing energy stored in winding 507 during the on time of switch 501 rapidly charges capacitor 505 across switch 501 to a high value. The magnetizing energy pumped into capacitor 506 provides the energy needed for zero voltage switching during the next switching cycle.

One important feature of the circuit of FIGS. 4A and 4B is that capacitors 406 and 506 are charged in a manner that differs from FIGS. 2A to 2C. In particular, capacitors 406 and 506 are charged when the main power switch 401, 501 is turned off, and capacitors 406, 506 absorb leakage energy from primary windings 407, 507, respectively. Thus, the leakage energy will be recycled to permit ZVS of main power switches 401, 501.

In contrast, in the embodiments of FIGS. 2A to 2C, capacitors 106, 206, 306 are charged when main power switches 101, 201, 301 are turned on, and energy is pumped to capacitors 106, 206, 306 via auxiliary windings 108, 208, 308.

Example

A practical circuit has been built using the flyback circuit in FIG. 4A. The values for the various components chosen were as follows:

Inductor 412-25 µH
N1-24 turns
N2-8 turns
Nz-12 turns
Capacitor 406-0.01 µF

Capacitor 410-three 220 μF capacitors

Auxiliary switch 402-part number IRF820, manufactured by International Rectifier.

Main power switch 401-part number IRF840, manufactured by International Rectifier.

Diodes 403,413,414-part number BYV26E, manufactured by Philips.

Diodes 409-part number MBR20200, manufactured by Motorola.

On time for switch 402-200 nS

Switching frequency-120 kHz

Output voltage-18 V

Output current-2.23 A

Output power-40 W

Figure 6:
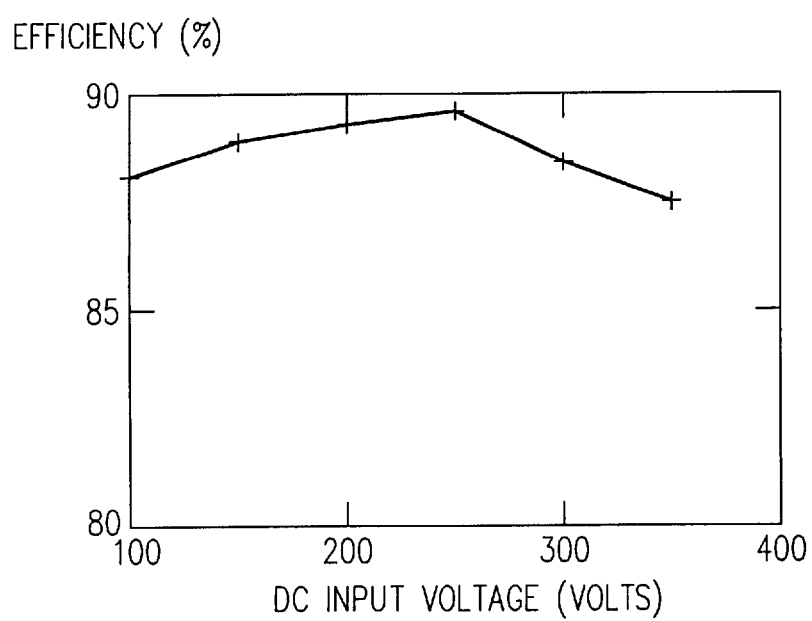
FIG. 6 illustrates the relation between efficiency and DC input voltage for a power supply in accordance the FIG. 4A embodiment.

N2 is the number of turns the output winding 415. FIG. 6 shows the efficiency of the converter versus input voltage Vi. The circuit can reach almost 90% efficiency for a 40W load.

Figure 7:
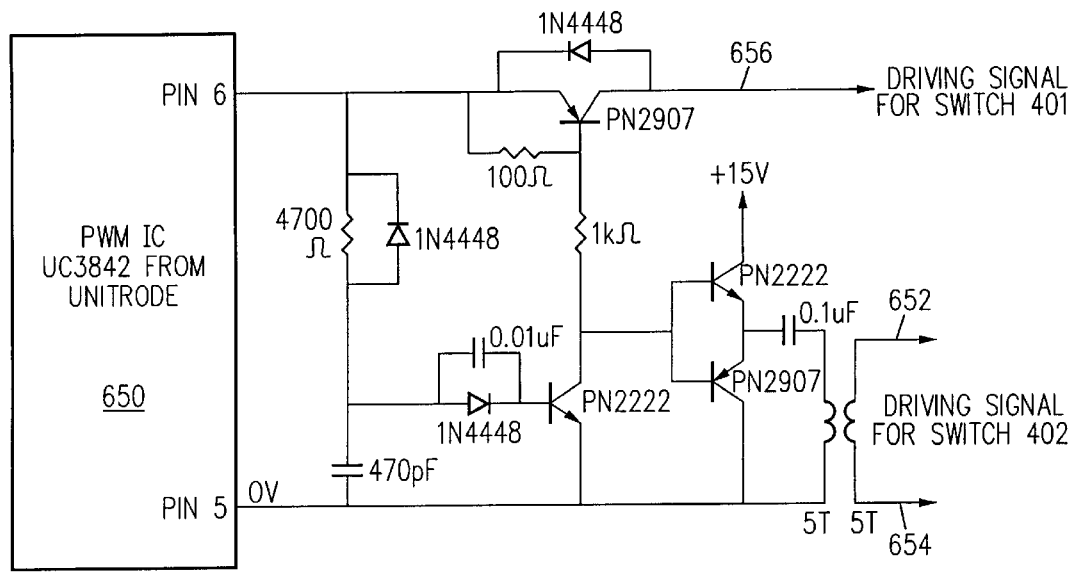
FIG. 7 is a schematic diagram of a control circuit used for controlling switches 401 and 402 in the embodiment of the FIG. 4A circuit used to generate the data of FIG. 6.
Figure 8:
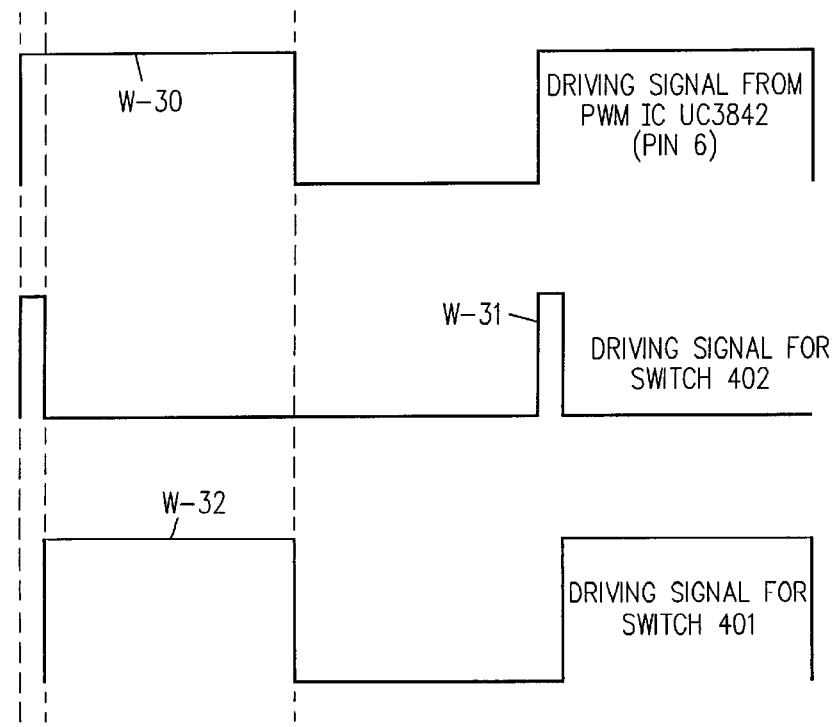
FIG. 8 is a timing diagram showing voltage at various nodes in the schematic diagram of FIG. 7.

FIG. 7 schematically illustrates the control circuit used to drive the switches in the circuit used to generate the data of FIG. 6. The main control circuit was device UC3842, sold by Unitrode. FIG. 8 shows voltage waveforms at various nodes of this circuit. In FIG. 8, waveform W-30 is the voltage produced at pin 6 of the UC3842 (circuit 650); waveform W-31 is the voltage across leads 652 and 654, which drives switch 402; and waveform W-32 is the voltage at lead 656, which drives switch 401.

While the invention has been described with respect to specific embodiments, those skilled in the art will recognize that changes can be made in form and detail without departing from the spirit and scope of the invention. For example, different filter circuits can be connected to the converter to generate a DC output voltage. Different kinds of switches (FETs, bipolar transistors, or SCRs, for example) can be used. Inductors 112, 212, 312, 412, 512 can be integrated with the transformer 128, 228, 328, 428, 528. (This can be accomplished by using the leakage inductance between windings 108, 208, 308, 408, 508 and windings 107, 207, 307, 407, 507 as inductors 112, 212, 312, 412, 512, respectively.) My invention can be used with other topologies, e.g. full bridge or half bridge converters. (This typically involves using two sets of auxiliary windings, inductors, capacitors and switches to permit ZVS for the positive and negative switching cycles.) Flyback and forward converters in accordance with my invention can have one or more output windings.

It will also be appreciated by those skilled in the art that the order in which series-connected elements appear can be modified without changing the operation of the circuit. Merely by way of example, one could place capacitor 106 between inductor 112 and switch 102 (see FIG. 2A), and the circuit would operate the same as it does having capacitor 106 placed between switch 102 and winding 108. In like manner, diode 413 could be placed elsewhere in the series loop comprising winding 408, inductor 412 and switch 402 (FIG. 4A). Likewise, diode 513 could be placed elsewhere in the series loop comprising winding 508, inductor 512 and switch 502 (FIG. 4B). Accordingly, all such changes come within my invention.

I claim:

1. A switching power supply comprising:

a power switch having a parasitic capacitance associated therewith;

a first winding coupled in series with said power switch;

a second winding magnetically coupled to said first winding;

a capacitor; and a second switch coupled in series with said capacitor and said second winding, wherein when said second switch closes, energy stored on said capacitor causes current to flow through said second winding, which causes current to flow through said first winding, which in turn causes charge to flow off said parasitic capacitance before said power switch turns on.

2. Switching power supply of claim 1 further comprising an inductor coupled in series with said second switch, said second winding and said capacitor.

3. Switching power supply of claim 1 wherein said switching power supply is a boost converter.

4. Switching power supply of claim 1 wherein said switching power supply is a buck converter.

5. Switching power supply of claim 1 wherein said switching power supply is a buck-booster converter.

6. Switching power supply of claim 1 wherein said switching power supply is a forward converter, and said first and second windings are part of a transformer, said transformer comprising a third winding for delivering power to a load.

7. Switching power supply of claim 1 wherein said switching power supply is a flyback converter, said first and second windings are part of a flyback transformer, said flyback transformer comprising a third winding for delivering power to a load.

8. A method for discharging parasitic capacitance across a switch in a switching power supply, said switch being connected in series with a first winding, said first winding being magnetically coupled to a second winding, said method comprising the steps of:

connecting said second winding to a capacitor, said capacitor having charge stored thereon such that current is caused to flow from said capacitor through said second winding, said current flowing through said second winding causing current to flow through said first winding, said current in said first winding removing charge from said parasitic capacitance and reducing voltage across said parasitic capacitance; and closing said switch after the voltage across said parasitic capacitance has been reduced.

9. Method of claim 8 wherein a diode is coupled across said switch, current through said second winding causing said diode to conduct before said switch is closed.

\* \* \* \* \*